(12) United States Patent
Yamamoto et al.

(10) Patent No.: US 6,283,086 B1
(45) Date of Patent: Sep. 4, 2001

(54) ENGINE CONTROL APPARATUS

(75) Inventors: Kazuhisa Yamamoto; Masao Kubodera; Takeo Kiuchi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/672,056

(22) Filed: Sep. 29, 2000

(30) Foreign Application Priority Data

Oct. 4, 1999 (JP) .................................................. 11-283578

(51) Int. Cl.$^7$ .................................................. F02D 29/02
(52) U.S. Cl. ..................................... 123/198 D; 123/179.4
(58) Field of Search ........................... 123/198 D, 179.3, 123/179.4, 395, 399

(56) References Cited

U.S. PATENT DOCUMENTS

| | | | |
|---|---|---|---|
| 4,510,396 | * | 4/1985 | Uchida et al. ........................ 600/511 |
| 4,862,854 | * | 9/1989 | Oda et al. ............................ 123/399 |
| 5,451,820 | * | 9/1995 | Gotoh et al. ......................... 123/179.4 |
| 6,192,847 | * | 2/2001 | Davis ................................. 123/179.4 |

FOREIGN PATENT DOCUMENTS

| | | |
|---|---|---|
| 08-168105 | 6/1996 | (JP) . |
| 09-209790 | 8/1997 | (JP) . |

\* cited by examiner

*Primary Examiner*—Marguerite McMahon
(74) *Attorney, Agent, or Firm*—Armstrong, Westerman, Hattori, McLeland & Naughton, LLP

(57) ABSTRACT

An engine control apparatus is provided that is capable of improving drivability and reducing the volume of exhaust gas expelled. In the engine control apparatus of the present invention, it is determined whether or not a vehicle is stopped. When the vehicle has stopped, it is determined whether or not it is possible to acquire road traffic information, for example, including traffic congestion information and the like, and traveling conditions information, for example, including the current position of the vehicle and information on a route to a destination. When it is possible to acquire this information, a determination is made as to whether or not the current position of the vehicle is within a traffic congested area based on the road traffic information and the traveling conditions information. If the vehicle is within a traffic congested area, stopping of the operation of the engine is prohibited.

4 Claims, 6 Drawing Sheets

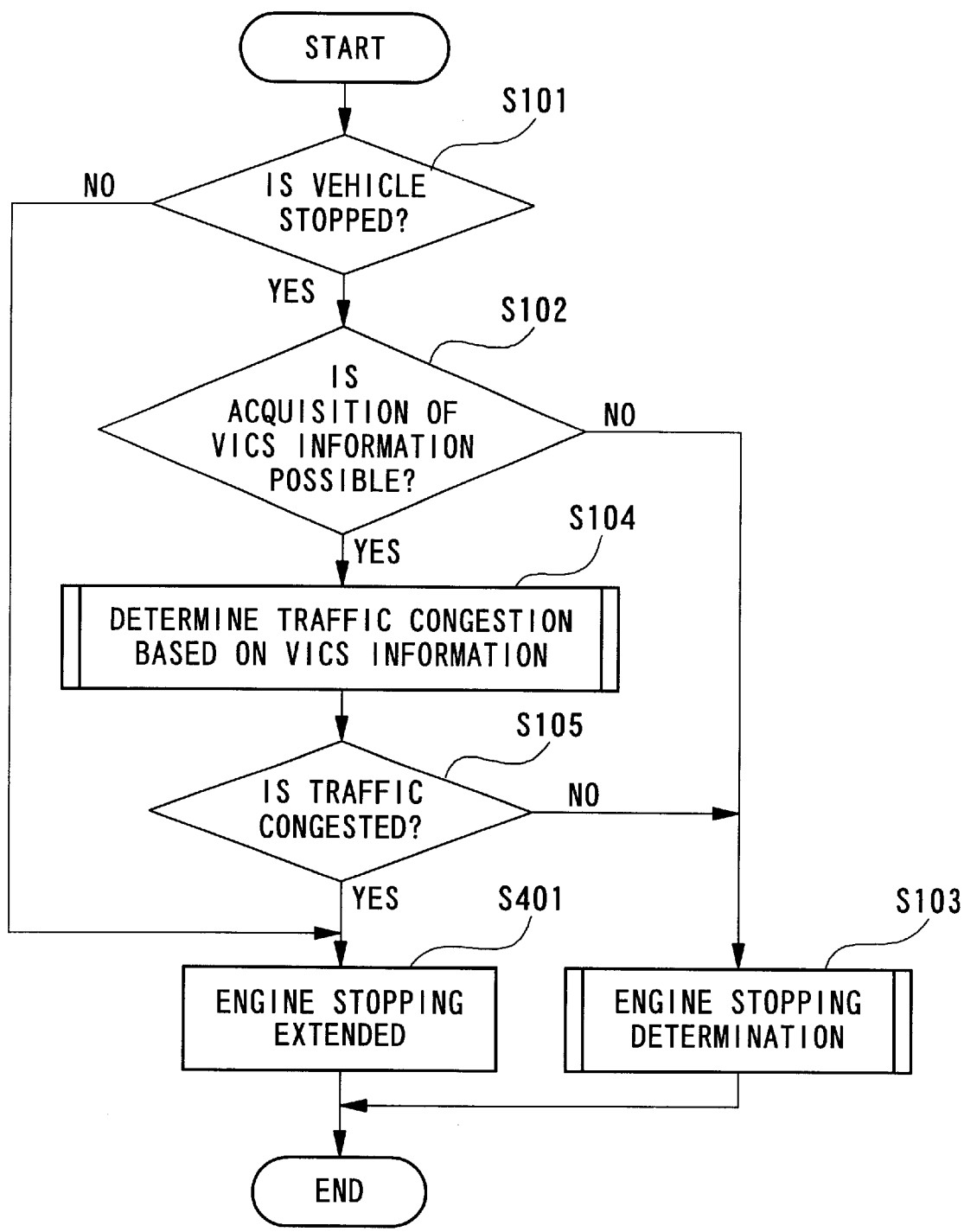

ENGINE CONTROL APPARATUS

BACKGROUND OF THE INVENTION

1. Field of the Invention

The present invention relates to an engine control apparatus for a vehicle for temporarily stopping the operation of an engine when, for example, the vehicle is in a halted state while the engine is operating.

This application is based on Japanese Patent Application No. Hei 11-283578 (Unpublished), the contents of which are incorporated herein by reference.

2. Description of the Related Art

Conventionally, a vehicle is known that is provided with an engine stopping apparatus for temporarily stopping an engine that is operating in an idling state such as when waiting for a signal at an intersection, or when a vehicle is stopped in congested traffic or the like, or when a state in which the accelerator pedal is not depressed continues for a predetermined length of time. In this type of vehicle, by stopping the operation of the engine while the vehicle is in an idling state such as when the vehicle is stopped, and operating the engine only when it is necessary for the vehicle to travel, a reduction in the volume of exhaust gas that is expelled and an improvement in the fuel consumption rate is achieved.

However, in congested traffic, for example, when the traveling of the vehicle is series of frequent repeated starts and stops, the stopping and starting of the engine is also frequently repeated. When the engine is started, a shock is generated in the vehicle, and the drawback arises that the frequent repetition of this shock being generated leads to a deterioration in the drivability. Moreover, when the engine is started, the drawback arises that there is an increase in fuel consumption due to the energy used to rotate the starter and the operation of the engine in the poor state of combustion efficiency that exists during startup of the engine. At the same time, the drawback arises that the frequent repetition of the engine starting causes the volume of exhaust gas expelled to increase, compared to when the engine is running while the vehicle is in an idling state.

To counter drawbacks such as these, as is disclosed in, for example, Japanese Unexamined Patent Application, First Publication No. Hei 8-168105, a hybrid vehicle is known which is provided with an engine stopping apparatus for stopping the engine when a congestion determining apparatus determines that the vehicle is in congested traffic and causing a vehicle to travel using only a motor. According to this hybrid vehicle, the frequent repetition of the starting and stopping of the engine can be avoided when the vehicle is in congested traffic, and it possible to achieve a reduction in the amount of exhaust gas expelled and an improvement in the fuel consumption rate by traveling using only the motor.

However, the above hybrid vehicle is a type of hybrid vehicle that is capable of traveling using the output of only the motor when the operation of the engine is stopped. Accordingly, in, for example, a type of hybrid vehicle in which the output of the engine is supplemented by the output of the motor while the vehicle is being started, or in a vehicle that is not provided with a motor (i.e. is not a hybrid vehicle), it is not possible to reduce the repeated starting and stopping of the engine that accompanies the frequent repetition of the starting and stopping of a vehicle in congested traffic or the like. Therefore, the drawback exists that it is not possible to inhibit the deterioration in drivability caused by the shock that is generated in a vehicle when the engine is started, or the increase in the volume of exhaust gas that is expelled.

SUMMARY OF THE INVENTION

The present invention was conceived of in view of the above circumstances. It is an object of the present invention to provide an engine control apparatus capable of improving drivability and reducing the volume of exhaust gas expelled by reducing the number of times an engine stops and starts in accordance with the operational state of the vehicle.

In order to solve the above described drawbacks and achieve the above object, the engine control apparatus according to the first aspect of the present invention comprises an engine stopping determining device (steps S201, S203, and S204 in the embodiment described below) for determining whether to stop an operation of an engine (the engine E) based on predetermined stopping conditions; an engine stopping device (step S205) for stopping the operation of the engine when a determination is made to stop the operation of the engine by the engine stopping determining device; a traffic congestion determining device (steps S104 and S105) for determining whether traffic is congested; and an engine stopping prohibiting device (step S106) for prohibiting an operation of the engine stopping device so as to prohibit the operation of the engine from being stopped when it is determined by the traffic congestion determining device that traffic is congested.

According to the engine control apparatus having the above structure, because the stopping of the operation of the engine is prohibited when it is determined by the traffic congestion determining device that traffic is congested, even in driving conditions in which the vehicle would normally be repeatedly starting and stopping frequently, it is possible to prohibit the frequent repeated starting and stopping of the engine. Therefore, it is possible to reduce the number of times a shock is generated in the vehicle when the engine starts, and to prevent a deterioration in the drivability. It is also possible to reduce the volume of exhaust gas expelled by reducing the operation of the engine in the state of poor combustion efficiency that exists when the engine is started.

Moreover, in the engine control apparatus according to the second aspect of the present invention, the engine stopping prohibiting device prohibits stopping of the operation of the engine for a predetermined time when it is determined by the traffic congestion determining device that traffic is congested.

According to the engine control apparatus having the above structure, it is possible to reliably prohibit the stopping of the operation of the engine for a predetermined time, and to more surely improve the drivability. At the same time, it is also possible to reduce the volume of exhaust gas that is expelled.

Furthermore, by making it possible to appropriately alter this predetermined time in accordance with information such as the traveling conditions of the vehicle and the extent of the congested area, it is possible to bring about an even greater improvement in drivability and reduction in the volume of exhaust gas expelled.

In the engine control apparatus according to the third aspect of the present invention, the engine control apparatus further comprises a traffic congestion information acquisition device (the road information receiving section 51) for acquiring traffic congestion information from outside a vehicle in which the engine control apparatus is mounted, and the traffic congestion determining device determines whether traffic is congested based on the traffic congestion information acquired by the traffic congestion information acquisition device.

According to the engine control apparatus having the above structure, it is possible to easily and reliably determine whether a vehicle is in congested traffic by using traffic congestion information included in road traffic information such as VICS (vehicle information and communication system) information and the like for congestion information. As a result, it is possible to bring about an even greater improvement in drivability and reduction in the volume of exhaust gas expelled. Moreover, in a navigation device that is capable, for example, of calculating the current position of a vehicle using beacon devices installed in the road, gyro-sensors, or GPS (global positioning system) that uses artificial satellites, or is capable of setting route information to a destination or the like based on the current position and map information, by using traffic congestion information included in road traffic information such as VICS information and the like, it is possible to control the prohibition of the stopping of the engine operation flexibly while considering the state of congestion at not only the current position of the vehicle, but also on the planned travel route.

In the engine control apparatus according to the fourth aspect of the invention, the engine control apparatus further comprises a traveling conditions detector (the vehicle speed sensor 31, the brake switch 32, or the accelerator switch 33) for detecting traveling information showing traveling conditions of a vehicle in which the engine control apparatus is mounted, and the traffic congestion determining device determines whether traffic is congested based on the traveling information showing traveling conditions detected by the traveling conditions detector.

According to the engine control apparatus having the above structure, it is possible to flexibly control the prohibition of the stopping of the engine operation while considering the state of travel of the vehicle based on the vehicle speed, the operation of the brake pedal, or the operation of the accelerator pedal.

BRIEF DESCRIPTION OF THE DRAWINGS

FIG. 6 is a flow chart showing the operation of the engine control apparatus according to a variant example of the present embodiment.

DETAILED DESCRIPTION OF THE PREFERRED EMBODIMENTS

Figure 1:
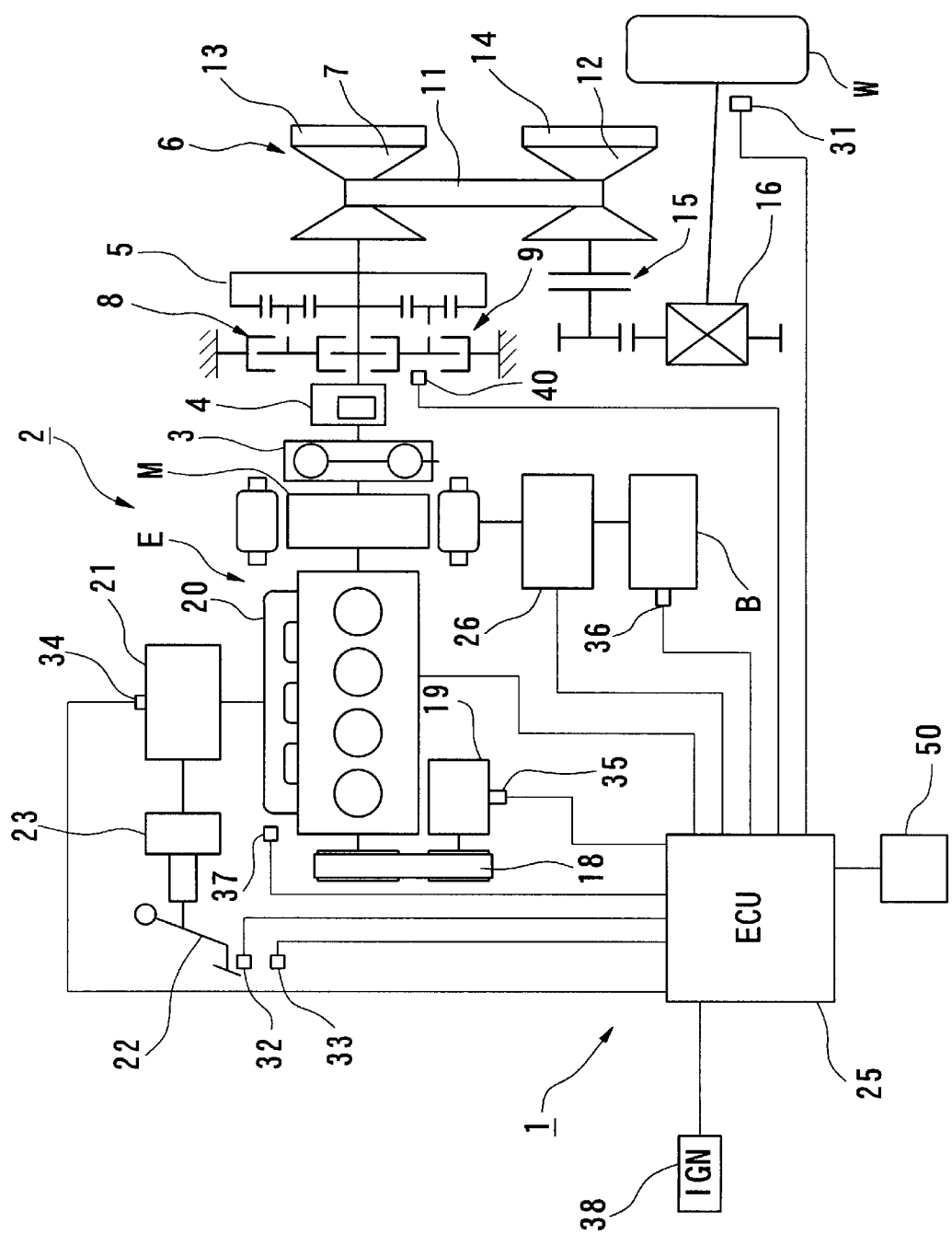
FIG. 1 is a block diagram showing the structure of the power transmission system in a hybrid vehicle provided with the engine control apparatus according to an embodiment of the present invention.
Figure 2:
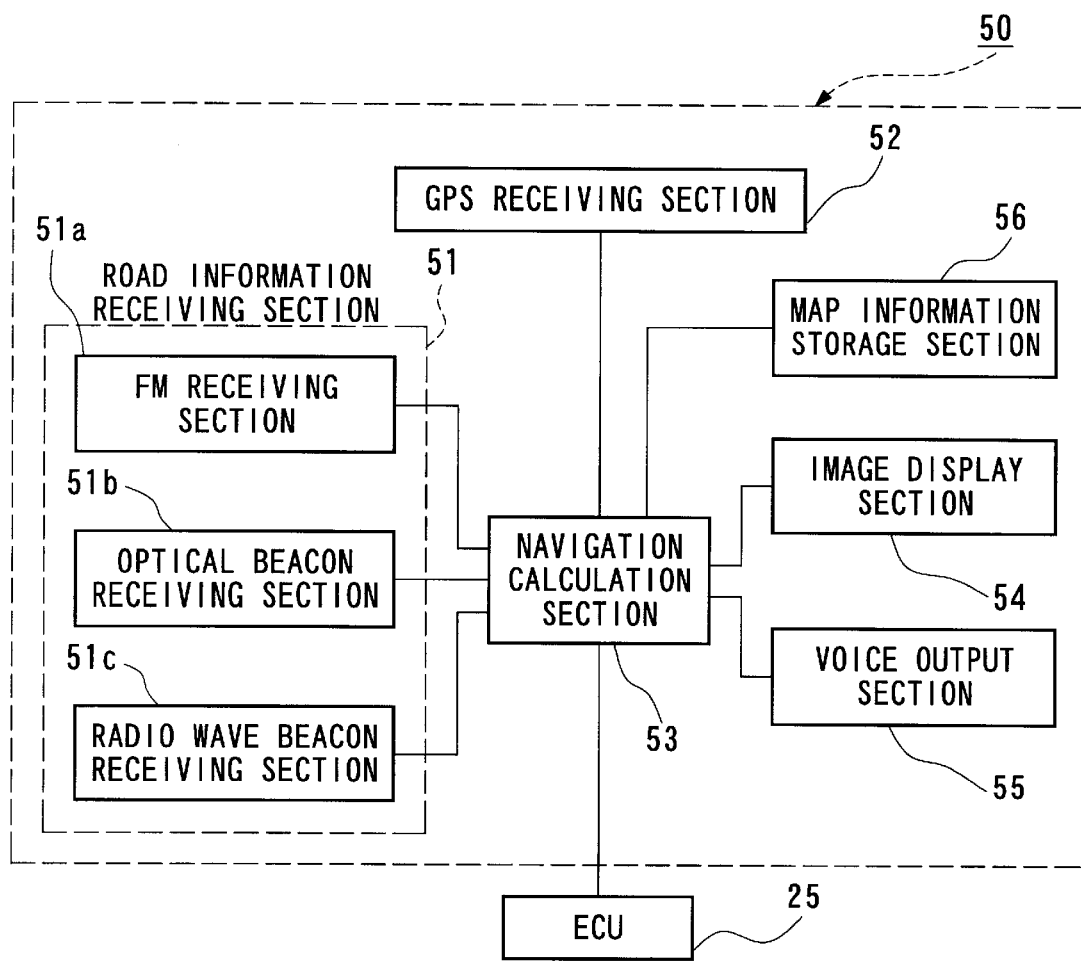
FIG. 2 is a structural diagram of the navigation device shown in FIG. 1.

An embodiment of the engine control apparatus of the present invention will now be described with reference made to the attached drawings. FIG. 1 is a block diagram showing the structure of the power transmission system in a vehicle 2 provided with the engine control apparatus 1 according to an embodiment of the present invention, while FIG. 2 is a block diagram showing the structure of the navigation device 50 shown in FIG. 1.

The vehicle 2 is a hybrid vehicle, for example, and supplements the drive of a drive shaft of an engine E with a motor generator M linked to the engine E. When drive force is transmitted to the motor generator M from a drive wheel W during deceleration, the motor generator M functions as a generator and generates regenerative braking force. The motor generator M then recovers kinetic energy of the vehicle 2 as electrical energy and supplies it to a battery B.

In the power transmission system shown in FIG. 1, the output shaft of the engine E and the rotating shaft of the motor generator M linked thereto are structured so as to rotate a dual mass flywheel 3 and to drive an oil pump 4 to rotate. The output shaft of the engine E and the rotating shaft of the motor generator M are also connected to a drive pulley 7 of a CVT (continuously variable transmission) 6 via a planetary gear 5 for switching between forward and reverse movement. The planetary gear 5 for switching between forward and reverse movement can selectively engage hydraulic actuated friction elements 8 and 9 due to the movement of a hydraulic switching valve (not shown in the figures) linked to a selector lever (not shown in the figures) when this selector lever is operated. As a result, the direction of rotation of the drive force of the engine E or motor generator M input to a drive pulley 7 of the CVT 6 can be switched.

The rotation of the drive pulley 7 is transmitted to a driven pulley 12 via a metallic belt 11. In this case, the ratio of the number of rotations of the drive pulley 7 to the driven pulley 12 is determined by the diameter of the windings of the metallic belt 11 around each of the pulleys 7 and 12. These winding diameters are controlled by a pressing force generated by the oil pressure imparted to the side chambers 13 and 14 of the pulleys 7 and 12. Note that this oil pressure is generated by the oil pump 4 and is then supplied to the side chambers 13 and 14. Moreover, the rotation of the driven pulley 12 is transmitted to a wheel W via a starting clutch 15 and a differential 16.

The output shaft of the engine E is connected to an air compressor 19 via a rotating belt 18. In addition, an air intake passage 20 of the engine E is connected to a negative pressure tank 21, and the negative pressure tank 21 is linked with a brake pedal 22 via a brake booster 23.

The engine control apparatus 1 according to the present embodiment is constructed with an ECU 25 provided with a microcomputer (not shown in the figures) comprising a CPU (central processing unit), RAM (random access memory), ROM (read only memory), and the like. The ECU 25 is connected to a fuel supply apparatus (not shown in the figures) and an ignition apparatus (not shown in the figures) provided for the engine E, and controls the ignition timing, the amount of fuel supplied to the engine E, and the like. The ECU 25 is also connected to a power drive unit 26, and the motor generator M and the battery B for transferring electrical energy are connected to the power drive unit 26. The power drive unit 26 is constructed so as to receive instructions from the ECU 25 and be able to control the drive and regeneration of the motor generator M.

Because of this, the following signals are input into the ECU 25.

- a signal from a vehicle speed sensor 31 for detecting the vehicle speed V based on the number of revolutions of the drive wheel W.
- a signal from a brake switch 32 for detecting an operation of the brake pedal 22.
- a signal from an accelerator switch 33 for detecting an operation of an accelerator pedal (not shown in the figures).

a signal from a brake vacuum tank pressure sensor 34 for detecting the internal pressure in the vacuum tank 21.

a signal from an air conditioner switch 35 for turning the air compressor 19 on and off.

a signal from a remaining battery charge sensor 36 for detecting the remaining charge in the battery B.

a signal from a water temperature sensor 37 for detecting the temperature of cooling water for the engine E.

a signal from an ignition switch 38 for turning the ignition on and off.

a signal from a shift position sensor 40 for detecting whether the planetary gear 5 for switching between forward and reverse movement is in the forward movement range or in the reverse movement range.

A navigation device 50 is further connected to the ECU 25. The ECU 25 controls the engine E by referring to information obtained by the navigation device 50.

As is shown in FIG. 2, the navigation device 50 may be constructed, for example, from a road information receiving section 51 for receiving road traffic information such as VICS (vehicle information and communication system) information and the like, a GPS (global positioning system) receiving section 52 for measuring the position of the vehicle 2 using artificial satellites, a navigation calculation section 53, an image display section 54, a voice output section 55, and a map information storage section 56 comprising a storage medium capable of being read by a computer such as a CD (compact disc)-ROM, a DVD (digital versatile disc)-ROM, and the like.

The road information receiving section 51 is provided, for example, with an FM (frequency modulated) receiving section 51a for receiving road traffic information such as VICS information by FM multiplex broadcast, an optical beacon receiving section 51b for receiving road traffic information by optical signals from beacon devices (not shown in the figures) installed in the road and the like, and a radio wave beacon receiving section 51c for receiving road traffic information by radio wave signals from a beacon device.

Note that, in addition to receiving road traffic information such as road congestion information, the optical beacon receiving section 51b and the radio wave beacon receiving section 51c are capable of measuring the position of a vehicle by receiving position information on the vehicle 2 from a beacon device, in the same way as the GPS receiving section 52.

The navigation calculation section 53 is provided, for example, with a microcomputer comprising a CPU, RAM, ROM (not shown in the figures), and the like and performs map matching with map information obtained from the map information storage section 56 based on, for example, position information on the vehicle 2 obtained from the road information receiving section 51, the GPS receiving section 52 or an gyro-sensor (not shown in the figures) or the like. The navigation calculation section 53 also displays the current position of the vehicle 2 and route information and the like to a destination on a map plotted on the image display section 54, and outputs various types of guidance voices used for route guidance to a destination or the like to the voice output section 55.

The navigation calculation section 53 may also, for example, output road traffic information including congestion information and traveling conditions information such as the current position of the vehicle 2 and route information to the destination to the ECU 25 controlling the engine E.

Figure 3:
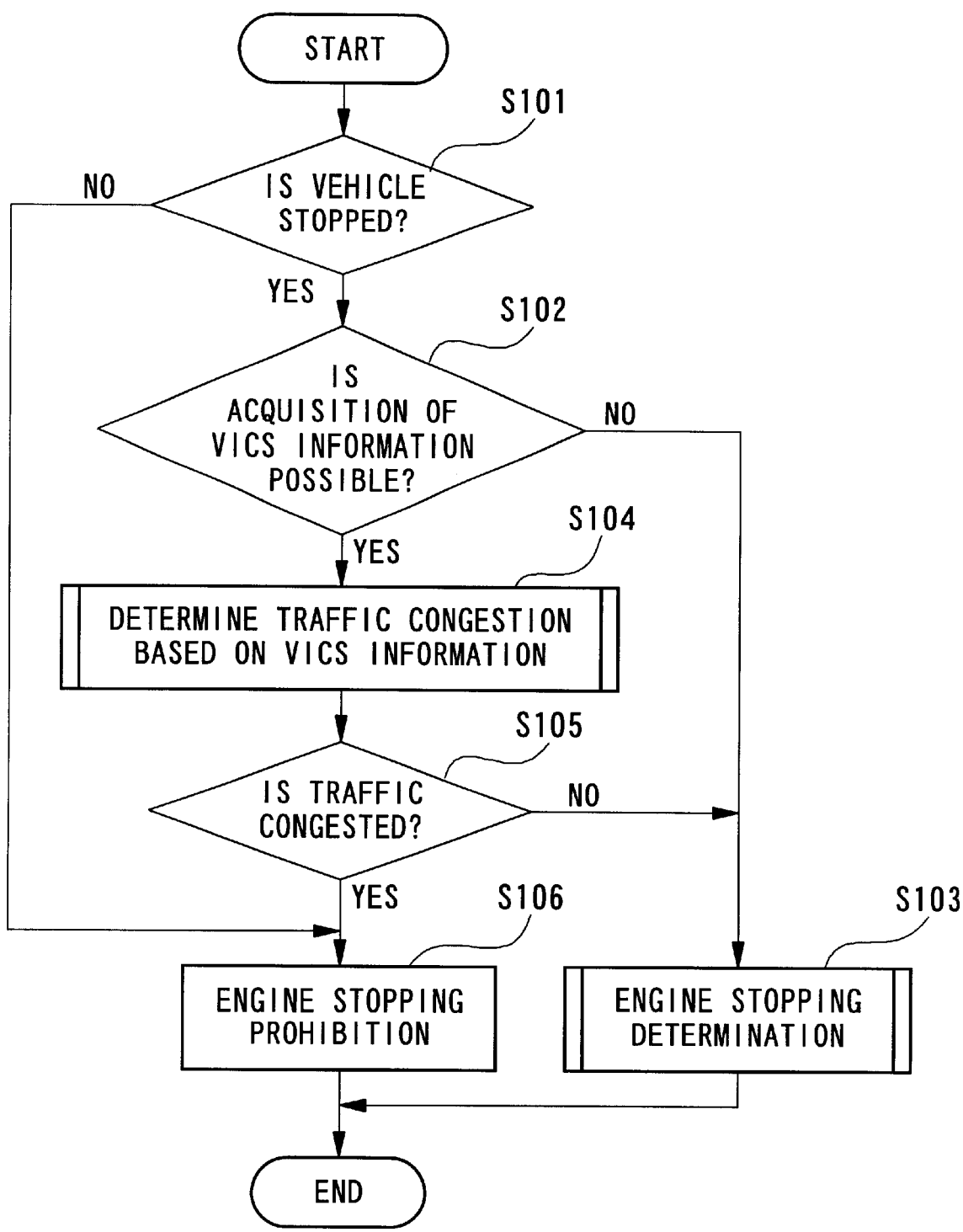
FIG. 3 is a flow chart showing the operation of the processing to determine a prohibition on the stopping of the engine from among the operations of the engine control apparatus shown in FIG. 1.
Figure 4:
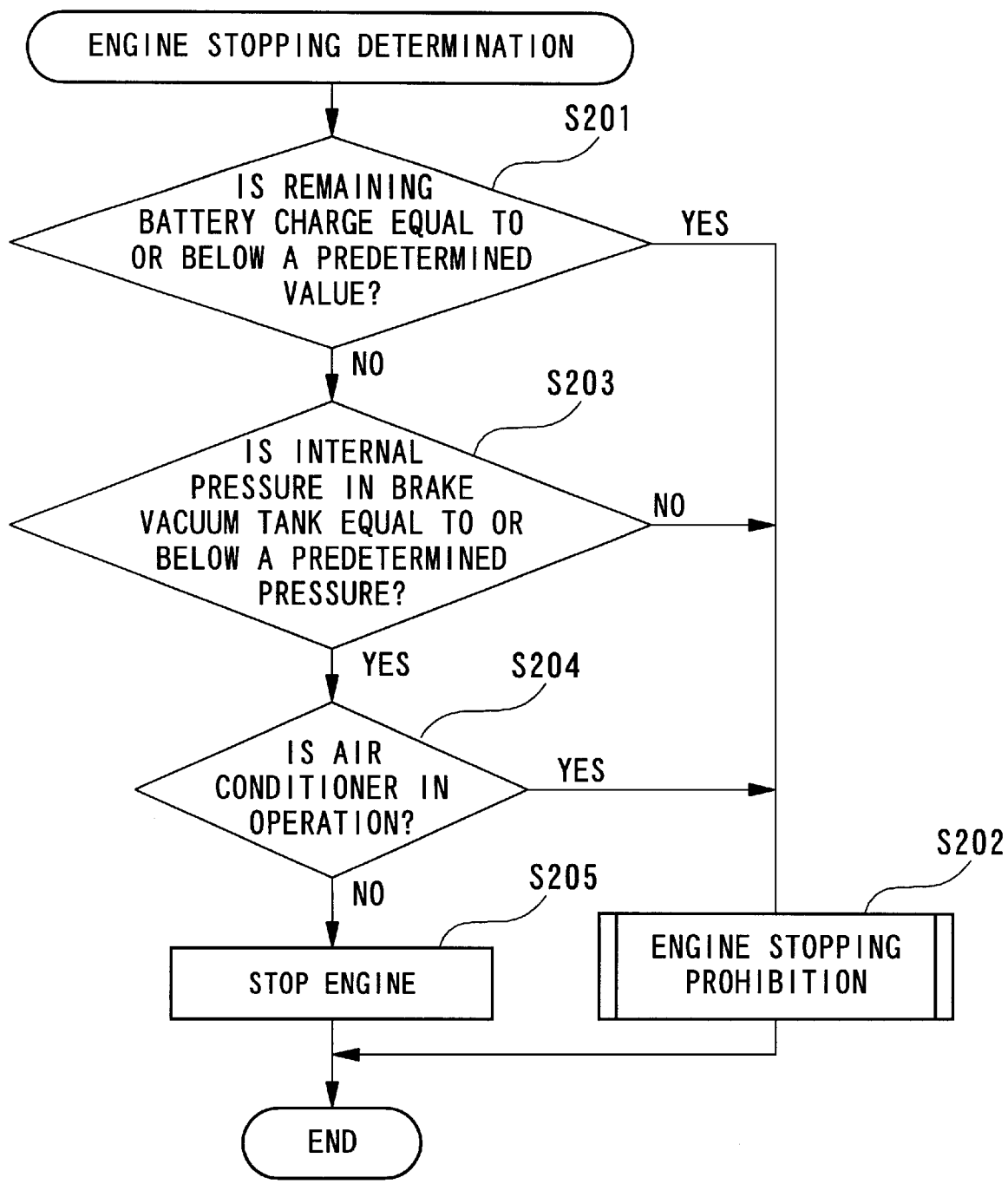
FIG. 4 is a flow chart showing the operation of the engine stopping determination processing shown in FIG. 3.
Figure 5:
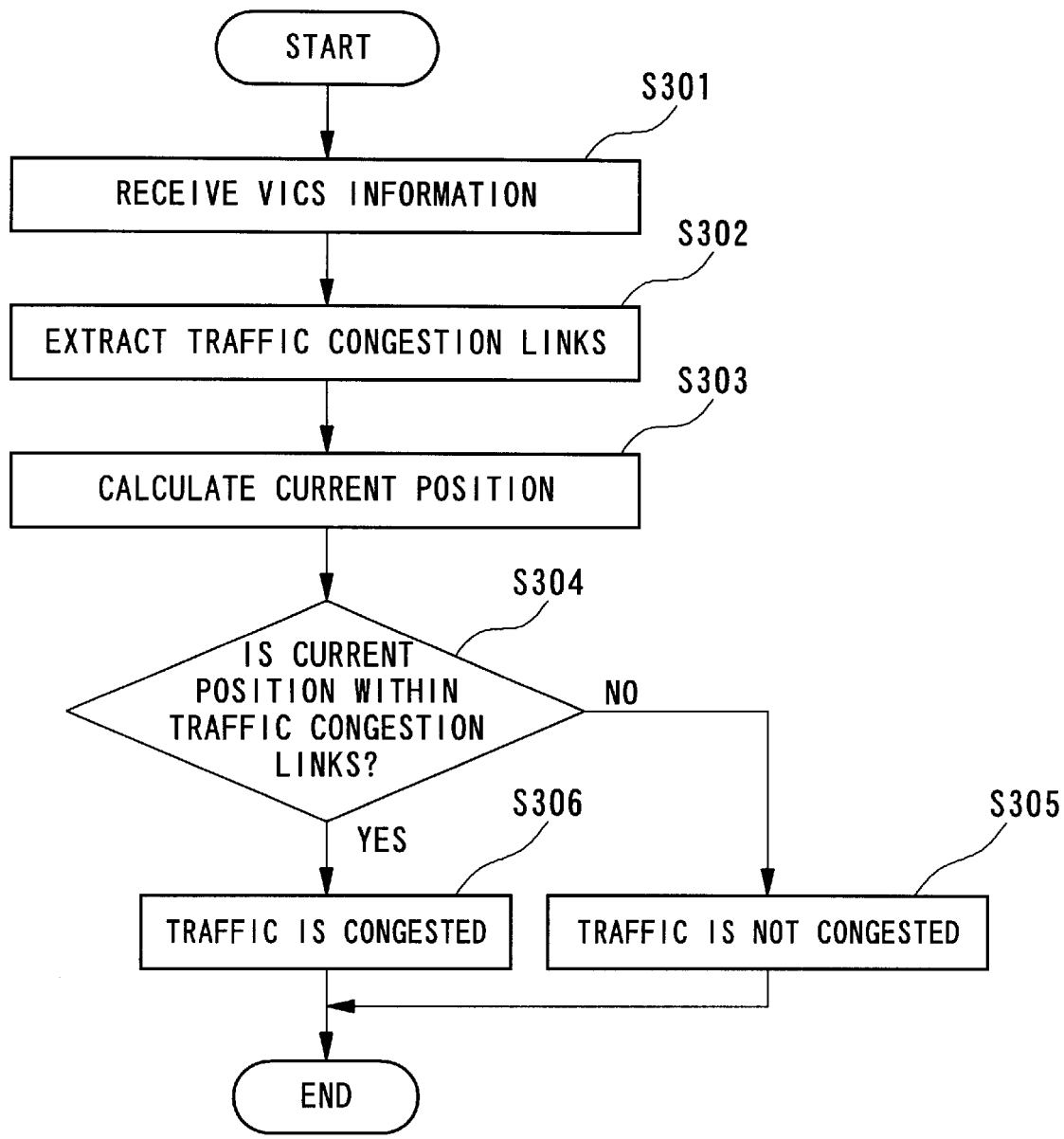
FIG. 5 is a flow chart showing the operation of the traffic congestion determination processing shown in FIG. 3.

The engine control apparatus according to the present embodiment is provided with a structure such as that described above. Next, the operation of the engine control apparatus 1 will be described with reference made to the attached drawings. FIG. 3 is a flow chart showing the operation of processing to determine a prohibition on the stopping of the engine from among the operations of the engine control apparatus I shown in FIG. 1. FIG. 4 is a flow chart showing the operation of the processing for the engine stopping determination shown in FIG. 3. FIG. 5 is a flow chart showing the operation of the traffic congestion determination processing shown in FIG. 3.

A description will now be given of the processing to determine a prohibition on the stopping of the engine based on the flow chart shown in FIG. 3.

Firstly, in step S101, a determination is made as to whether or not the vehicle 2 is stopped. In this case, it is determined that the vehicle 2 is stopped when, for example, the speed of the vehicle 2 is equal to or below a predetermined speed. When the result of this determination is "NO", the processing of step S106 and thereafter is performed.

If, however, the result of the determination is "YES", it is determined whether or not it is possible to acquire road traffic information including traffic congestion information and the like, and to acquire traveling conditions information including the current position of the vehicle 2 and route information to a destination (step S102). When the result of this determination is "NO", the flow proceeds to step S103. After the processing to determine whether the engine is stopped, as described below, is performed, the processing routine is ended.

If, however, the result of the determination in step S102 is "YES", the flag value of a traffic congestion determination flag is set to either "1" or "0" by performing the traffic congestion determination processing described below based on road traffic information and traveling conditions information (step S104).

Next, based on the flag value of the traffic congestion determination flag set in step S104, it is determined whether or not the flag value of the traffic congestion determination flag is "1", namely, whether or not the vehicle 2 is located in a congested area (Step S105). If the result of this determination is "NO", the flow proceeds to step S103. After the engine stopping determination processing, the processing routine is ended.

If, however, the determination in step S105 is "YES", the stopping of the operation of the engine is prohibited (step S106), and the processing routine is ended.

Next, the processing of the engine stopping determination in the aforementioned step S103 will be described with reference made to FIGS. 1 and 4.

Firstly, in step S201, using the remaining battery charge sensor 36, it is determined whether or not the remaining charge of the battery B is equal to or below a predetermined remaining battery charge. If the result of this determination is "YES", the processing flow proceeds to step S202 and the stopping of the operation of the engine is prohibited. The reason for this is that, when the engine E is restarted after the operation of the engine E has been stopped, it is necessary for electric power to be supplied from the battery B. Therefore, it is necessary for the remaining charge of the battery B to be provided with at least the remaining battery charge necessary for restarting the engine E.

Note that, the battery B needs electric power to drive the various types of accessories and the like that act as an electrical load on the battery B while the engine is stopped. Therefore, it is preferable that the aforementioned predetermined remaining battery charge is set so as to be in excess of the sum of the electric power needed to restart the engine E and the electric power needed to drive the various accessories. When the remaining charge of the battery B is equal to or below a predetermined remaining battery charge, as described above, in order to prevent the engine E from not being able to be restarted or to prevent the life span of the battery B from being decreased, the stopping of the operation of the engine E is prohibited.

If, however, the result of the determination in step S201 is "NO", the flow proceeds to step S203.

In step S203, it is determined whether or not the internal pressure in the vacuum tank 21 detected by the brake vacuum tank pressure sensor 34 is equal to or below a predetermined pressure. If the result of this determination is "NO", the processing flow proceeds to step S202 and the stopping of the operation of the engine is prohibited. Namely, because the brakes are boosted by the brake booster 23 using the air intake passage pressure when the engine is in operation, it is necessary to keep the internal pressure of the vacuum tank 21, which stores air intake passage pressure, equal to or below at least a predetermined pressure necessary for the operation of the brakes. Accordingly, when this predetermined pressure is not stored, the stopping of the operation of the engine is prohibited.

If, however, the result of the determination in step S203 is "YES", the flow proceeds to step S204.

In step S204, based, for example, on whether the air conditioner switch 35 is on or off, it is determined whether or not an air conditioner (not shown in the figures), provided inside the vehicle 2 is in operation. If the result of this determination is "YES", the flow proceeds to step S202 and stopping the operation of the engine is prohibited. Namely, when the air conditioner is in operation, because the air compressor 19 is rotated by the output shaft of the engine E via the rotating belt 18, it is prohibited to stop the operation of the engine when it is necessary to operate the air compressor, i.e. when the air conditioner is in operation.

If, however, the result of the determination in step S204 is "NO", the operation of the engine E is stopped (step S205) and the processing routine is ended.

Next, the traffic congestion determination processing in the aforementioned step S104 will be described with reference made to FIGS. 1, 2, and 5.

Firstly, in step S301, the road information receiving section 51 receives, for example, VICS information as road traffic information.

Next, based on the received road traffic information, the traffic congestion links are extracted, namely, the position and extent of the traffic congestion area are calculated (step S302).

Next, based on position information for the vehicle 2 obtained from the optical beacon receiving section 51b, the radio wave beacon receiving section 51c, the GPS receiving section 52, or an gyro-sensor (not shown in the figures) or the like, the navigation calculation section 53 calculates the current position of the vehicle 2. In addition to this, the navigation calculation section 53 calculates information on traveling conditions including, for example, information on a route to a destination and the like (step S303).

Next, it is determined (step S304) whether or not the current position of the vehicle is within a traffic congested area from the traffic congestion links calculated in step S302, namely, the information on the position and extent of the traffic congested area, and the information on the current position of the vehicle 2 calculated in step S303. If the result of this determination is "NO", the flow proceeds to step S305. After the flag value of the congestion determination flag has been set to "0", the processing routine is then ended.

If, however, the result of the determination is "YES", the flag value of the traffic congestion determination flag is set to "1" (step S306) and the processing routine is then ended.

According to the engine control apparatus of the present embodiment, in the navigation device 50 which is able to calculate the current position of a vehicle and set route information to a destination and the like based on the current position and on map information, by using VICS information as road traffic information including traffic congestion information and the like, for example, it is possible to easily and reliably ascertain the state of congestion at the current position of the vehicle 2. Moreover, in order to prohibit the operation of the engine from being stopped in congested traffic, even when the traveling of the vehicle 2 is such that it is making frequent repeated starts and stops, it is possible to prohibit the engine E from making frequent repeated starts and stops. As a result, the number of times a shock is generated in the vehicle 2 when the engine starts is reduced and deterioration in the drivability can be prevented. In addition, it is possible to decrease the operation of the engine E in the state of poor combustion efficiency that exists when the engine is started and to reduce the volume of exhaust gas expelled.

Note that, in the present embodiment, stopping the operation of the engine E was prohibited when it was determined that the vehicle 2 was located within a traffic congested area, however, the present invention is not limited to this. Namely, as a variant example of the engine control apparatus 1 according to the present embodiment whose operation is shown in the flow chart in FIG. 6, it is possible to prohibit the stopping of the operation of the engine E for a predetermined length of time only. In this case, as is shown in FIG. 6, it is determined whether or not the vehicle 2 is located within a traffic congested area (step S105), and if the result of this determination is "YES", the stopping of the operation of the engine is prohibited for only the predetermined length of time (step S401). The processing routine is then ended.

Furthermore, in the present embodiment, a decision was made as to whether or not to prohibit the stopping of the operation of the engine by determining whether or not the current position of the vehicle 2 was located within traffic congested area, however, the present invention is not limited to this. For example, it is also possible to decide whether or not to prohibit the stopping of the operation of the engine for a predetermined length of time only, by determining whether or not the planned traveling route is congested.

Note also that, in the present embodiment, it was determined whether or not the current position of the vehicle 2 was located within a traffic congested area based on road traffic information such as VICS information and the like, however, the present invention is not limited to this. For example, it is also possible to determine whether or not the current position of the vehicle 2 is within a traffic congested area based on information showing the traveling state of the vehicle 2 such as, for example, the vehicle speed V detected by the vehicle speed sensor 31, the operation of the brake pedal 22 detected by the brake switch 32, and the operation of the accelerator pedal detected by the accelerator switch 33.

Note also that the present invention is not limited to a hybrid vehicle and can, of course, also be applied to vehicles whose engine operation is stopped based on predetermined stopping conditions.

What is claimed is:

1. An engine control apparatus, comprising:
  an engine stopping determining device for determining whether to stop an operation of an engine based on predetermined stopping conditions;

an engine stopping device for stopping the operation of said engine when a determination is made to stop the operation of said engine by said engine stopping determining device;

a traffic congestion determining device for determining whether traffic is congested; and an engine stopping prohibiting device for prohibiting an operation of said engine stopping device so as to prohibit the operation of said engine from being stopped when it is determined by said traffic congestion determining device that traffic is congested.

2. The engine control apparatus according to claim 1, wherein said engine stopping prohibiting device prohibits stopping of the operation of said engine for a predetermined time when it is determined by said traffic congestion determining device that traffic is congested.

3. The engine control apparatus according to claim 1, further comprising a traffic congestion information acquisition device for acquiring traffic congestion information from outside a vehicle in which said engine control apparatus is mounted, wherein said traffic congestion determining device determines whether traffic is congested based on said traffic congestion information acquired by said traffic congestion information acquisition device.

4. The engine control apparatus according to claim 1, further comprising a traveling conditions detector for detecting traveling information showing traveling conditions of a vehicle in which said engine control apparatus is mounted, wherein said traffic congestion determining device determines whether traffic is congested based on said traveling information showing traveling conditions detected by said traveling conditions detector.

* * * * *